United States Patent
Huang et al.

(10) Patent No.: US 10,452,867 B2
(45) Date of Patent: Oct. 22, 2019

(54) SYSTEM FUNCTION INVOKING METHOD AND APPARATUS, AND TERMINAL

(71) Applicant: Huawei Device Co., Ltd., Shenzhen (CN)

(72) Inventors: Xi Huang, Shenzhen (CN); Huangwei Wu, Shenzhen (CN)

(73) Assignee: HUAWEI DEVICE CO., LTD., Dongguan (CN)

(*) Notice: Subject to any disclaimer, the term of this patent is extended or adjusted under 35 U.S.C. 154(b) by 105 days.

(21) Appl. No.: 14/936,826

(22) Filed: Nov. 10, 2015

(65) Prior Publication Data

US 2016/0063266 A1    Mar. 3, 2016

Related U.S. Application Data

(63) Continuation of application No. PCT/CN2014/078260, filed on May 23, 2014.

(30) Foreign Application Priority Data

May 27, 2013   (CN) .......................... 2013 1 0201782

(51) Int. Cl.
   *G06F 21/62*   (2013.01)
   *G06F 21/60*   (2013.01)
   (Continued)

(52) U.S. Cl.
   CPC .............. *G06F 21/629* (2013.01); *G06F 8/61* (2013.01); *G06F 21/51* (2013.01); *G06F 21/52* (2013.01);
   (Continued)

(58) Field of Classification Search
   CPC ..... G06F 21/62; G06F 21/6281; G06F 21/604
   See application file for complete search history.

(56) References Cited

U.S. PATENT DOCUMENTS 5,535,416 A * 7/1996 Feeney ................... G06F 9/526
                                                 703/27
6,895,585 B2 * 5/2005 Smith .................... G06F 9/4881
                                                 709/202
(Continued)

FOREIGN PATENT DOCUMENTS

CN         1924814 A      3/2007
CN       101119550 A      2/2008
(Continued)

OTHER PUBLICATIONS

Jeon et al.; Dr. Android and Mr. Hide: Fine-grained Permissions in Android Applications; 2012; Retrieved from the Internet <URL: http://dl.acm.org/citation.cfm?id=2381938>; pp. 1-12 as printed.*

(Continued)

*Primary Examiner* — Saleh Najjar
*Assistant Examiner* — Michael W Chao
(74) *Attorney, Agent, or Firm* — Conley Rose, P.C.

(57) ABSTRACT

A system function invoking method and apparatus, and a terminal are disclosed and are related to the field of computer technologies. The method includes acquiring an installation package of a first application program; granting a first permission of a system to the first application program according to the installation package, where the first permission is used to, when the first application program is in a running state, forbid a second application program from invoking at least one system function; and running the first application program, and forbidding the second application program from invoking the at least one system function. The apparatus includes a first acquiring module, an authorization module, and an invoking module.

17 Claims, 10 Drawing Sheets

(51) Int. Cl.
  *G06F 21/51* (2013.01)
  *G06F 21/52* (2013.01)
  *H04L 29/06* (2006.01)
  *G06F 8/61* (2018.01)
(52) U.S. Cl.
  CPC ............ *G06F 21/604* (2013.01); *G06F 21/62* (2013.01); *G06F 21/6281* (2013.01); *H04L 63/102* (2013.01); *G06F 2221/033* (2013.01)

(56) References Cited

U.S. PATENT DOCUMENTS

| | | | |
|---|---|---|---|
| 7,793,355 B2 | 9/2010 | Little et al. | |
| 7,815,100 B2 | 10/2010 | Adams et al. | |
| 8,595,489 B1* | 11/2013 | Faaborg | H04W 12/02 713/166 |
| 9,208,349 B1* | 12/2015 | Miliefsky | G06F 21/629 |
| 9,954,975 B2* | 4/2018 | Raleigh | H04L 67/20 |
| 10,013,237 B2* | 7/2018 | Snell | G06F 7/26 |
| 10,044,757 B2* | 8/2018 | Qureshi | G06F 21/10 |
| 10,114,932 B2* | 10/2018 | Marion | G06F 21/53 |
| 10,303,501 B2* | 5/2019 | Ali | G06F 9/45541 |
| 10,305,937 B2* | 5/2019 | Weiss | G06F 21/74 |
| 2004/0255169 A1 | 12/2004 | Little et al. | |
| 2005/0257209 A1 | 11/2005 | Adams et al. | |
| 2007/0050781 A1 | 3/2007 | Furuichi et al. | |
| 2012/0117615 A1 | 5/2012 | Mackinnon et al. | |
| 2012/0209923 A1 | 8/2012 | Mathur et al. | |
| 2013/0333039 A1* | 12/2013 | Kelly | G06F 21/51 726/24 |
| 2014/0304711 A1* | 10/2014 | Tennant | G06F 9/50 718/104 |
| 2017/0177854 A1* | 6/2017 | Gligor | G06F 21/44 |
| 2018/0293389 A1* | 10/2018 | Mahaffey | H04L 63/0227 |
| 2018/0302443 A1* | 10/2018 | Weiss | G06F 21/74 |
| 2019/0037049 A1* | 1/2019 | Raleigh | H04L 67/20 |

FOREIGN PATENT DOCUMENTS

| | | |
|---|---|---|
| CN | 102170495 A | 8/2011 |
| CN | 102200922 A | 9/2011 |
| CN | 102521548 A | 6/2012 |
| CN | 102737427 A | 10/2012 |
| CN | 103049692 A | 4/2013 |
| CN | 103310149 A | 9/2013 |
| CR | 100468343 C | 3/2009 |

OTHER PUBLICATIONS

Herpich et al.; A Trusted Ecosystem for Android Applications BAsed on Context-Aware Access Control; 2012; Retrieved from the Internet <URL: http://ieeexplore.ieee.org/abstract/document/6461011/>; pp. 1-6 as printed.*

Cooley; Metis: Mocking Data for Usability & Privacy; 2013; Retrieved from the Internet <URL: https://scholarworks.wm.edu/cgi/viewcontent.cgi?article=1587&context=honorstheses>; pp. 1-27, as printed. (Year: 2013).*

Henry; PDroid Gives You Control Over the Personal Information Your Android Apps Can Access; 2011; Retrieved from the Internet <URL: https://lifehacker.com/5866597/pdroid-gives-you-control-over-the-personal-information-your-android-apps-can-access>; pp. 1-1, as printed. (Year: 2011).*

Meehan; LBE Privacy Guard: How Safe Is Your Private Data?; 2011; Retrieved from the Internet <URL: https://android.appstorm.net/reviews/security/lbe-privacy-guard-how-safe-is-your-private-data/>; pp. 1-9, as printed. (Year: 2011).*

Dube; Monitor Access & Guard Your Android Privacy With LBE Privacy Guard; 2011; Retrieved from the Internet <URL: https://www.makeuseof.com/tag/monitor-access-guard-android-privacy-lbe-privacy-guard/>; 1-11, as printed. (Year: 2011).*

No stated author; LBE Privacy Guard App for Android Review; 2012; Retrieved from the Internet <URL: HTTPs://youtu.be/PiGqmauOLNY?t=2m54s>, pp. 1-5, as printed. (Year: 2012).*

Partial English Translation and Abstract of Chinese Patent Application No. CN101119550, Mar. 4, 2016, 5 pages.

Partial English Translation and Abstract of Chinese Patent Application No. CN102170495, Mar. 4, 2016, 6 pages.

Partial English Translation and Abstract of Chinese Patent Application No. CN102737427, Mar. 14, 2016, 7 pages.

Partial English Translation and Abstract of Chinese Patent Application No. CN102200922, Nov. 11, 2015, 5 pages.

Partial English Translation and Abstract of Chinese Patent Application No. CN103310149, Nov. 11, 2015, 4 pages.

"Application Fundamentals | Android Developers," Retrieved from the Internet: URL: https://web.archive.org/web/20130501113041/http://developer.android.com/guide/components/fundamentals.html [retrieved on Feb. 29, 2016], May 2013, 6 pages.

Foreign Communication From a Counterpart Application, European Application No. 14804100.7, Extended European Search Report dated Mar. 8, 2016, 9 pages.

Foreign Communication From a Counterpart Application, PCT Application No. PCT/CN2014/078260, English Translation of International Search Report dated Aug. 22, 2014, 2 pages.

Foreign Communication From a Counterpart Application, PCT Application No. PCT/CN2014/078260, English Translation of Written Opinion dated Aug. 22, 2014, 13 pages.

Foreign Communication From a Counterpart Application, Chinese Application No. 201310201782.0, Chinese Office Action dated Jul. 3, 2015, 8 pages.

"DevicePolicyManager | Android Developers," XP055429842, Nov. 25, 2012, 28 pages.

"Memory Management in Android," XP055429859, Jul. 5, 2010, 10 pages.

Foreign Communication From a Counterpart Application, European Application No. 14804100.7, European Office Action dated Dec. 5, 2017, 7 pages.

* cited by examiner

SYSTEM FUNCTION INVOKING METHOD AND APPARATUS, AND TERMINAL

CROSS-REFERENCE TO RELATED APPLICATIONS

This application is a continuation of International Application No. PCT/CN2014/078260, filed on 23 May 2014, which claims priority to Chinese Patent Application No. 201310201782.0, filed on May 27, 2013, both of which are hereby incorporated by reference in their entireties.

TECHNICAL FIELD

The present disclosure relates to the field of computer technologies, and in particular, to a system function invoking method and apparatus, and a terminal.

BACKGROUND

To perform control on security and stability of a system of a terminal, an invocation permission may be set for a system function provided by the system. Only an application program that has a permission to invoke the system function can invoke the system function, and the system function may be implemented by an application programming interface (API).

In the prior art, a system function invoking method is provided. After acquiring a highest permission of the system, a management program may read permission information of each application program and present the read permission information to a user, so that the user performs disabling setting on some permissions in the permission information, and forms permissions for which disabling is set into a permission database, and the management program may forbid the application program from invoking a system function corresponding to a permission in the permission database.

An existing management program needs to acquire the highest permission of the system, but the acquiring of the highest permission brings an insecure factor. In addition, disabling setting of a system function is applicable only to one application program, and if another application program also needs to disable the system function, the user needs to separately perform disabling setting for the system function in the other application program. When there are multiple application programs, the user needs to frequently perform disabling setting, which increases operation complexity of system function invocation and reduces efficiency of system function invocation.

SUMMARY

To resolve problems that acquiring of a highest permission brings an insecure factor, that operation complexity of system function invocation is increased, and that efficiency of system function invocation is reduced, embodiments of the present disclosure provide a system function invoking method and apparatus, and a terminal. The technical solutions are as follows.

According to a first aspect, the present disclosure provides a system function invoking method, and the method includes acquiring an installation package of a first application program; granting a first permission of a system to the first application program according to the installation package, where the first permission is used to, when the first application program is in a running state, forbid a second application program from invoking at least one system function; and running the first application program, and forbidding the second application program from invoking the at least one system function.

In a first possible implementation manner of the first aspect, before the granting a first permission of a system to the first application program according to the installation package, the method further includes acquiring a configuration file of the first application program from the installation package; and the granting a first permission of a system to the first application program according to the installation package includes reading configuration information of the first permission from the configuration file; and granting the first permission of the system to the first application program according to the configuration information.

In a second possible implementation manner of the first aspect, the second application program is any application program of all application programs except the first application program in the system; or the second application program is any application program of some application programs other than the first application program in the system.

With reference to the first aspect, or the first possible implementation manner of the first aspect, or the second possible implementation manner of the first aspect, in a third possible implementation manner of the first aspect, the forbidding the second application program from invoking the at least one system function includes for each system function of the at least one system function, if the second application program invoked the system function and the system function is currently in an invoked state of being invoked by the second application program, suspending or ending the invocation of the system function by the second application program; and for each system function of the at least one system function, if the second application program did not invoke the system function or the second application program invoked the system function but the system function is currently not in the invoked state of being invoked by the second application program, forbidding subsequent invocation of the system function by the second application program.

According to a second aspect, the present disclosure provides a system function invoking method, and the method includes configuring a first mode in a system; when a first application program is installed, granting a second permission of the system to the first application program, where the second permission is used to, when the first application program is in a running state, enable the system to be in the first mode, and the first mode is used to, when the system is in the first mode, forbid a second application program from invoking at least one system function; and running the first application program, and forbidding the second application program from invoking the at least one system function.

In a first possible implementation manner of the second aspect, the second application program is any application program of all application programs except the first application program in the system; or the second application program is any application program of some application programs other than the first application program in the system.

In a second possible implementation manner of the second aspect, after the forbidding the second application program from invoking the at least one system function, the method further includes, if the first application program exits running, switching the first mode to a second mode, where the second mode is used to, when the system is in the second mode, allow the second application program to invoke the at least one system function.

With reference to the second aspect, or the first possible implementation manner of the second aspect, or the second possible implementation manner of the second aspect, in a third possible implementation manner of the second aspect, the forbidding the second application program from invoking the at least one system function includes, for each system function of the at least one system function, if the second application program invoked the system function and the system function is currently in an invoked state of being invoked by the second application program, suspending or ending the invocation of the system function by the second application program; and for each system function of the at least one system function, if the second application program did not invoke the system function or the second application program invoked the system function but the system function is currently not in the invoked state of being invoked by the second application program, forbidding subsequent invocation of the system function by the second application program.

According to a third aspect, the present disclosure provides a system function invoking apparatus, and the apparatus includes a first acquiring module adapted to acquire an installation package of a first application program; an authorization module adapted to grant a first permission of a system to the first application program according to the installation package acquired by the first acquiring module, where the first permission is used to, when the first application program is in a running state, forbid a second application program from invoking at least one system function; and an invoking module adapted to run the first application program, and forbid, according to the first permission granted by the authorization module, the second application program from invoking the at least one system function.

In a first possible implementation manner of the third aspect, the apparatus further includes a second acquiring module adapted to, before the authorization module grants the first permission of the system to the first application program according to the installation package, acquire a configuration file of the first application program from the installation package; and the authorization module includes a reading unit adapted to read configuration information of the first permission from the configuration file; and an authorization unit adapted to grant the first permission of the system to the first application program according to the configuration information read by the reading unit.

In a second possible implementation manner of the third aspect, the second application program is any application program of all application programs except the first application program in the system; or the second application program is any application program of some application programs other than the first application program in the system.

With reference to the third aspect, or the first possible implementation manner of the third aspect, or the second possible implementation manner of the third aspect, in a third possible implementation manner of the third aspect, the invoking module includes a first invoking unit adapted to, for each system function of the at least one system function, if the second application program invoked the system function and the system function is currently in an invoked state of being invoked by the second application program, suspend or end the invocation of the system function by the second application program; and a second invoking unit adapted to, for each system function of the at least one system function, if the second application program did not invoke the system function or the second application program invoked the system function but the system function is currently not in the invoked state of being invoked by the second application program, forbid subsequent invocation of the system function by the second application program.

According to a fourth aspect, the present disclosure provides a system function invoking apparatus, and the apparatus includes a configuring module adapted to configure a first mode in a system; an authorization module adapted to, when a first application program is installed, grant a second permission of the system to the first application program, where the second permission is used to, when the first application program is in a running state, enable the system to be in the first mode configured by the configuring module, and the first mode is used to, when the system is in the first mode, forbid a second application program from invoking at least one system function; and an invoking module adapted to run the first application program, and forbid, according to the second permission granted by the authorization module, the second application program from invoking the at least one system function.

In a first possible implementation manner of the fourth aspect, the second application program is any application program of all application programs except the first application program in the system; or the second application program is any application program of some application programs other than the first application program in the system.

In a second possible implementation manner of the fourth aspect, the apparatus further includes a switching module adapted to, after the invoking module forbids the second application program from invoking the at least one system function, if the first application program exits running, switch the first mode to a second mode, where the second mode is used to, when the system is in the second mode, allow the second application program to invoke the at least one system function.

With reference to the fourth aspect, or the first possible implementation manner of the fourth aspect, or the second possible implementation manner of the fourth aspect, in a third possible implementation manner of the fourth aspect, the invoking module includes a first invoking unit adapted to, for each system function of the at least one system function, if the second application program invoked the system function and the system function is currently in an invoked state of being invoked by the second application program, suspend or end the invocation of the system function by the second application program; and a second invoking unit adapted to, for each system function of the at least one system function, if the second application program did not invoke the system function or the second application program invoked the system function but the system function is currently not in the invoked state of being invoked by the second application program, forbid subsequent invocation of the system function by the second application program.

According to a fifth aspect, the present disclosure provides a terminal, and the terminal includes the system function invoking apparatus according to the third aspect, or includes the system function invoking apparatus according to the fourth aspect.

Beneficial effects brought by the technical solutions provided in the embodiments of the present disclosure are as follows.

By granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and efficiency of system function invocation is reduced are resolved, and effects that security and efficiency of system function invocation are improved and that complexity of system function invocation is reduced are achieved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
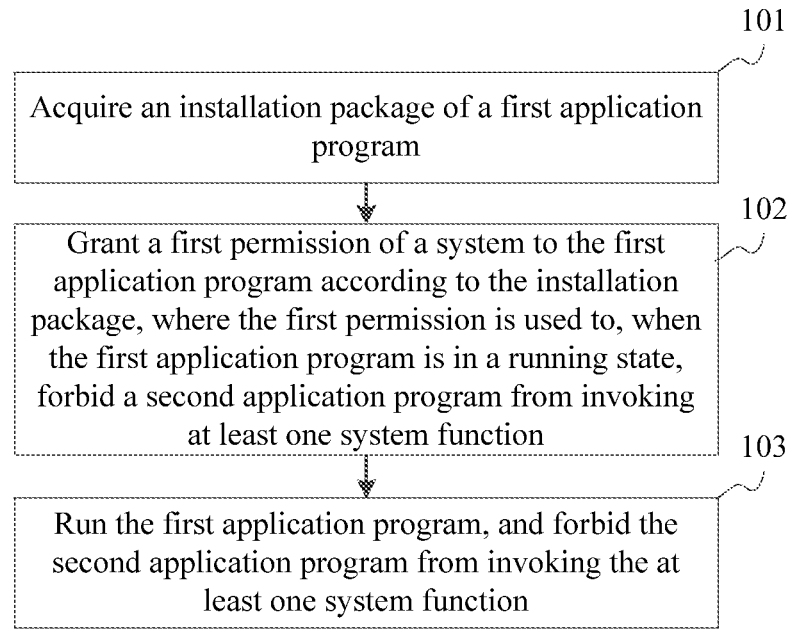
FIG. 1 is a method flowchart of a system function invoking method according to Embodiment 1 of the present disclosure.

Referring to FIG. 1, FIG. 1 shows a method flowchart of a system function invoking method according to Embodiment 1 of the present disclosure. The system function invoking method may be applied to a terminal, and the terminal may be a smart television set, a smartphone, a tablet computer, or the like. The system function invoking method includes the following steps.

Step 101: Acquire an installation package of a first application program.

The first application program is an application program installed on a system. Therefore, the system needs to acquire the installation package of the first application program so as to install the first application program according to the installation package.

Multiple methods for acquiring the installation package of the first application program are available for the system. For example, the system may access a network using the terminal to download the installation package from the network; or the system may establish a wired or wireless connection to another terminal using the terminal to acquire the installation package from the other terminal, which is not limited in this embodiment.

Step 102: Grant a first permission of a system to the first application program according to the installation package, where the first permission is used to, when the first application program is in a running state, forbid a second application program from invoking at least one system function.

When installing the first application program according to the installation package of the first application program, the system may grant a first permission pre-recorded in the installation package to the first application program, and configures the at least one system function whose invocation is controlled by the first application program, such that when the first application program is in a running state, the system forbids the second application program from invoking the at least one system function. The second application program is an application program other than the first application program in the system.

Step 103: Run the first application program, and forbid the second application program from invoking the at least one system function.

When running the first application program, the system sets the configured at least one system function to forbidding invocation of the second application program.

In conclusion, according to the system function invoking method provided in this embodiment of the present disclosure, by granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved.

Embodiment 2

Figure 2:
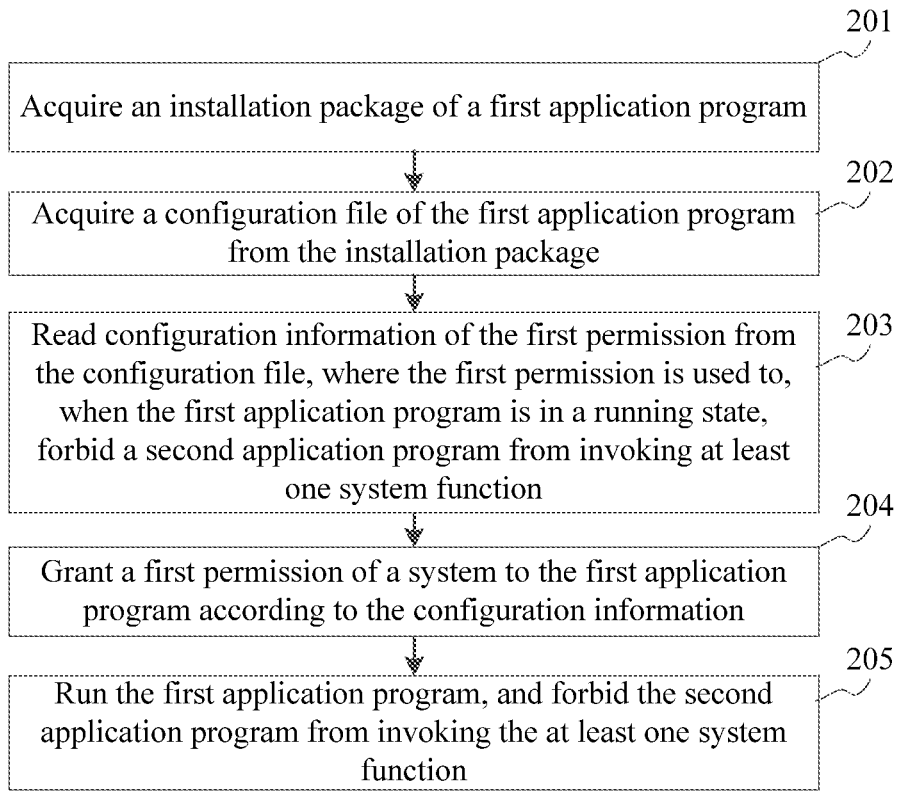
FIG. 2 is a method flowchart of a system function invoking method according to Embodiment 2 of the present disclosure.

Referring to FIG. 2, FIG. 2 shows a method flowchart of a system function invoking method according to Embodiment 2 of the present disclosure. The system function invoking method may be applied to a terminal, and the terminal may be a smart television set, a smartphone, a tablet computer, or the like. The system function invoking method includes the following steps.

Step 201: Acquire an installation package of a first application program.

The first application program is an application program installed on a system. Therefore, the system needs to acquire the installation package of the first application program so as to install the first application program according to the installation package.

Multiple methods for acquiring the installation package of the first application program are available for the system. For example, the system may access a network using the terminal to download the installation package from the network; or the system may establish a wired or wireless connection to another terminal using the terminal to acquire the installation package from the other terminal, which is not limited in this embodiment.

Step 202: Acquire a configuration file of the first application program from the installation package.

The installation package of the first application program includes the configuration file of the first application program, and the system may acquire the configuration file and configure the first application program according to information recorded in the configuration file. The configuration file may be edited by a developer as required when the first application program is developed.

Step 203: Read configuration information of a first permission from the configuration file, where the first permission is used to, when the first application program is in a running state, forbid a second application program from invoking at least one system function.

The first application program may control the invocation of the at least one system function in the system and permission check is needed for invocation of a system function. Therefore configuration information of the permission may be set in the configuration file such that the system grants the corresponding permission to the first application program according to the configuration information.

The configuration information of the first permission may be set in the configuration file, and when installing the first application program according to the installation package, the system may read the configuration information, and perform processing on the first application program according to the configuration information. The first permission is used to, when the first application program is in a running state, forbid the second application program from invoking the at least one system function.

The second application program may be any application program of all application programs except the first application program in the system, such that only the first application program in the system can invoke the at least one system function, thereby improving system security; or the second application program may be any application program of some application programs other than the first application program in the system, such that, besides the first application program, some application programs in the system can also invoke the at least one system function, thereby improving flexibility of system function invocation. The some application programs may be preset and modified, and a setting manner is not limited in this embodiment.

In this embodiment, an Android system is used as an example for description. Then the configuration file may be an AndroidManifest.xml file, and the configuration information of the first permission in the configuration file may be <uses-permission android:name="android.permission.PERMISSION_DISABLE"/>.

Step 204: Grant the first permission of the system to the first application program according to the configuration information.

To improve system security, after reading configuration information of all permissions in the configuration file, the system may present a function introduction of each permission to a user, such that the user may determine whether the permission is granted to the first application program according to the function introduction. If the user determines to grant the permission to the first application program, the system grants the permission to the first application program according to the configuration information and acquires installation information of the first application program, for example, an application component of the first application program, to implement an installation process of the first application program. If the user forbids granting the permission to the first application program, the system exits the installation of the first application program and ends the process.

After the installation process of the first application program is complete, the system may further record the configuration information of all permissions in an installation file of the system, such that when the system starts next time, the configuration information recorded in the installation file may be loaded into a memory, thereby implementing control of invocation of the system function according to the configuration information of the first permission in the installation file. In this embodiment, an Android system is used as an example for description. Then, the installation file of the system may be a /data/system/packages.xml file.

After the installation process of the first application program is complete, the system also needs to configure the at least one system function whose invocation is controlled by the first application program, such that when the first application program is in a running state, the system forbids the second application program from invoking the at least one system function. One system function may be implemented by one API, and a permission needs to be checked for invocation of the API. Therefore, disabling information of the permission corresponding to the API may be preset in the configuration file. After reading the disabling information of the permission, the system sets the permission to be such a permission that when the first application program is in a running state, the second application program cannot pass system check, such that the second application program is forbidden to invoke the API corresponding to the permission, that is, the control of system function invocation is implemented. For example, the disabling information of the permission in the configuration file is disabling information of a Short Message Service (SMS) receiving permission. Then, when the first application program is in a running state, the second application program cannot pass a check of the SMS receiving permission and the system forbids the second application program from invoking an SMS receiving API, such that the second application program is forbidden to invoke an SMS receiving system function.

In this embodiment, an Android system is still used as an example for description. Then, the disabling information of the permission in the configuration file may be <disable-permission android:name="android.permission.PERMISSION_A"/>, or the like. After reading the disabling information of the permission, the system sets permission A to be such a permission that when the first application program is in a running state, the second application program cannot pass system permission check.

Further, the system may also record disabling information of all permissions in the installation file of the system, such that when the system starts next time, the disabling information of the permissions recorded in the installation file is loaded into a memory, thereby implementing control of invocation of a system function corresponding to an API by controlling invocation of the API corresponding a permission. Timing for recording API information in the installation file is not limited in this embodiment. For example, the API information is recorded after a primary application program is installed, or the API information is recorded after the system restarts.

Step 205: Run the first application program, and forbid the second application program from invoking the at least one system function.

The forbidding the second application program from invoking the at least one system function may include: for each system function of the at least one system function, if the second application program invoked the system function and the system function is currently in an invoked state of being invoked by the second application program, suspending or ending the invocation of the system function by the second application program; and for each system function of the at least one system function, if the second application program did not invoke the system function or the second application program invoked the system function but the system function is currently not in the invoked state of being invoked by the second application program, forbidding subsequent invocation of the system function by the second application program.

For ease of understanding, in this embodiment, an example in which the system function is acquiring a geographic location of a terminal and the second application program is microblog is used for description. If microblog already invoked the service of acquiring the geographic location of the terminal before the first application program runs, and microblog is still using the service of acquiring the geographic location of the terminal when the first application program is in a running state, the terminal suspends or ends the service of acquiring the geographic location of the terminal by microblog. If microblog already invoked the service of acquiring the geographic location of the terminal before the first application program runs but microblog stops invocation of the service of acquiring the geographic location of the terminal when the first application program is in a running state, or microblog did not invoke the service of acquiring the geographic location of the terminal before the first application program runs, the terminal forbids microblog from invoking the service of acquiring the geographic location of the terminal when subsequently detecting by monitoring that microblog attempts to invoke the service of acquiring the geographic location of the terminal.

Further, when the second application program invokes the at least one system function, the system may return a null value NULL to the second application program, or may return a false value FALSE to the second application program, which is not limited in this embodiment.

It should be additionally noted that, if the first application program exits running, the system may allow the second application program to invoke the at least one system function. The system may determine the running state of the first application program by monitoring a system process, and the running state of the first application program may also be determined in another manner, which is not limited in this embodiment.

Figure 3A:
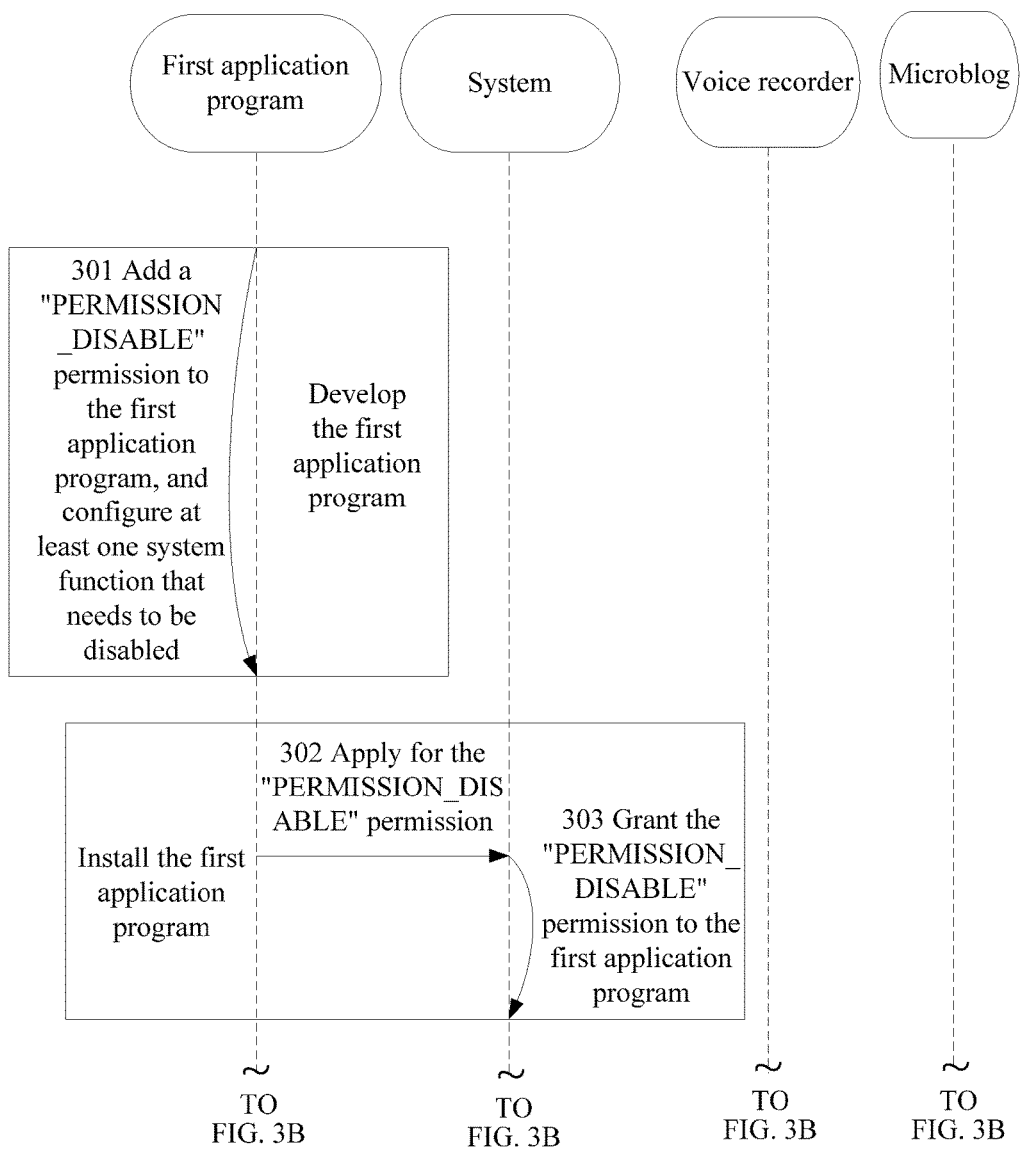
FIG. 3A and FIG. 3B are a schematic application diagram of the system function invoking method according to Embodiment 2 of the present disclosure.
Figure 3B:
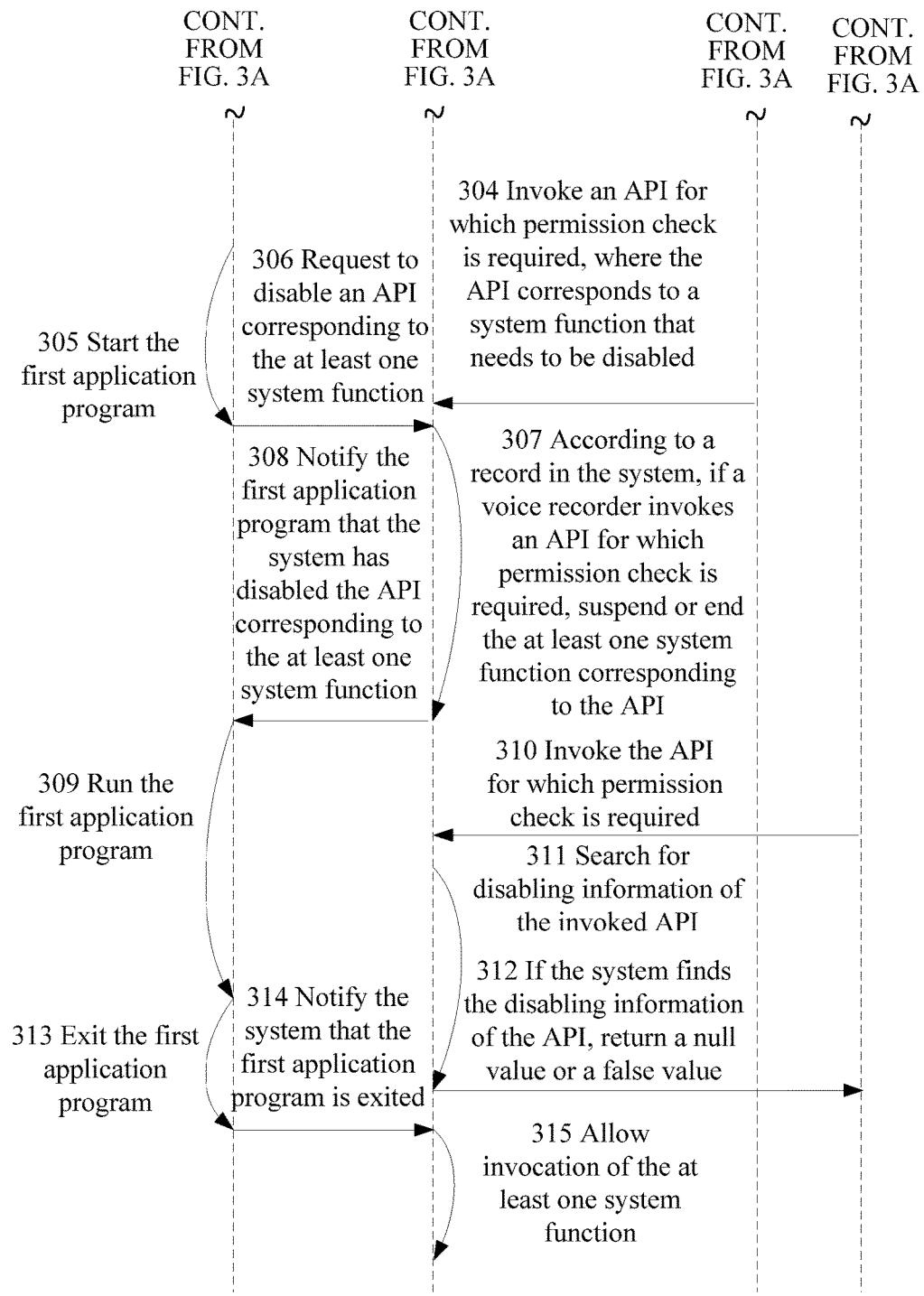

Referring to FIG. 3A and FIG. 3B, this embodiment further provides a schematic application diagram of the system function invoking method, where a voice recorder is a second application program that invokes a disabled system function before the first application program runs and still uses the system function when the first application program runs, and microblog is a second application program that invokes the disabled system function after the first application program runs. The system function invoking method is as follows.

Step 301: When a first application program is developed, add a "PERMISSION_DISABLE" permission to the first application program, and configure at least one system function whose invocation needs to be forbidden in the system when the first application program is in a running state.

Step 302: When the first application program is installed, the first application program applies for the "PERMISSION_DISABLE" permission from the system.

Step 303: The system grants the "PERMISSION_DISABLE" permission to the first application program.

Step 304: The voice recorder invokes an API for which permission check is required, where the API corresponds to a system function that needs to be disabled.

Step 305: Start the first application program.

Step 306: The first application program requests the system to disable an API corresponding to the at least one system function.

Step 307: According to a record in the system, if the voice recorder is invoking the API for which permission check is required, suspend or end the at least one system function corresponding to the API.

Step 308: The system notifies the first application program that the system has disabled the API corresponding to the at least one system function.

Step 309: Run the first application program.

Step 310: Microblog invokes an API for which permission check is required.

Step 311: The system searches for disabling information of the invoked API.

Step 312: If the system finds the disabling information of the API, return a null value or a false value to microblog.

Step 313: The first application program exits running.

Step 314: The first application program notifies the system that the first application program exits running.

Step 315: The system allows the voice recorder or microblog to invoke the at least one system function.

In conclusion, according to the system function invoking method provided in this embodiment of the present disclosure, by granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved. In addition, the second application program is any application program of some application programs other than the first application program in the system, such that a problem that flexibility of system function invocation is reduced because all application programs except the first application program are forbidden to invoke the at least one system function is resolved and an effect that the flexibility of system function invocation is improved is achieved.

Embodiment 3

Figure 4:
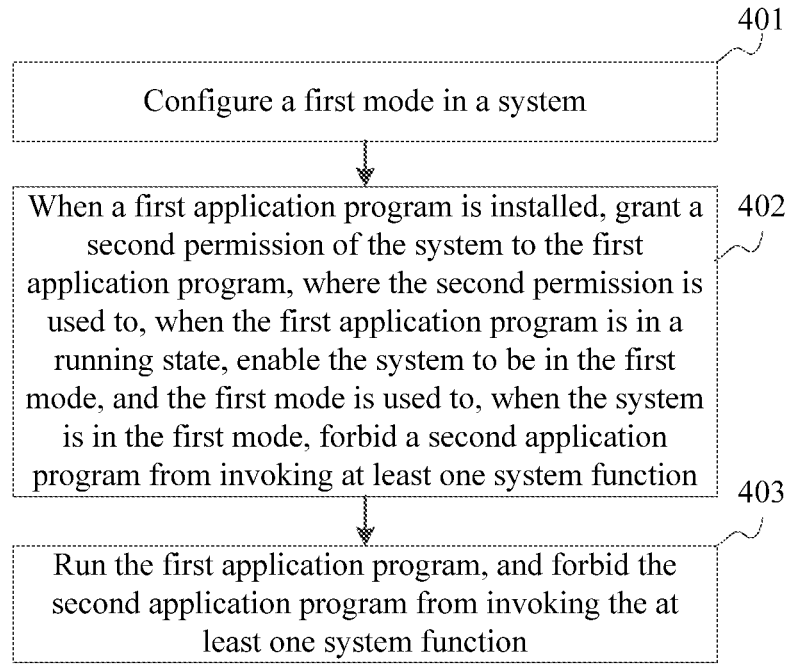
FIG. 4 is a method flowchart of a system function invoking method according to Embodiment 3 of the present disclosure.

Referring to FIG. 4, FIG. 4 shows a method flowchart of a system function invoking method according to Embodiment 3 of the present disclosure. The system function invoking method may be applied to a terminal, and the terminal may be a smart television set, a smartphone, a tablet computer, or the like. The system function invoking method includes the following steps.

Step 401: Configure a first mode in a system.

When the system is in the first mode, the system forbids a second application program from invoking at least one system function of the system. In this embodiment, the system may configure at least one first mode, and may configure at least one system function for each mode. Therefore, when configuring the first mode, the system needs to configure the at least one system function.

Step 402: When a first application program is installed, grant a second permission of the system to the first application program, where the second permission is used to, when the first application program is in a running state, enable the system to be in the first mode, and the first mode is used to, when the system is in the first mode, forbid a second application program from invoking at least one system function.

When installing the first application program, the system may grant the second permission pre-recorded in an installation package to the first application program, such that when the first application program is in a running state, the system is in the first mode. The second application program is an application program other than the first application program in the system.

Step 403: Run the first application program, and forbid the second application program from invoking the at least one system function.

When running the first application program runs, the system sets the at least one system function that is configured during the configuration of the first mode to be forbidden to be invoked by the second application program.

In conclusion, according to the system function invoking method provided in this embodiment of the present disclosure, by configuring a first mode in a system; granting, when a first application program is installed, a second permission of the system to the first application program, where the second permission is used to, when the first application program is in a running state, enable the system to be in the first mode, and the first mode is used to, when the system is in the first mode, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved.

Embodiment 4

Figure 5:
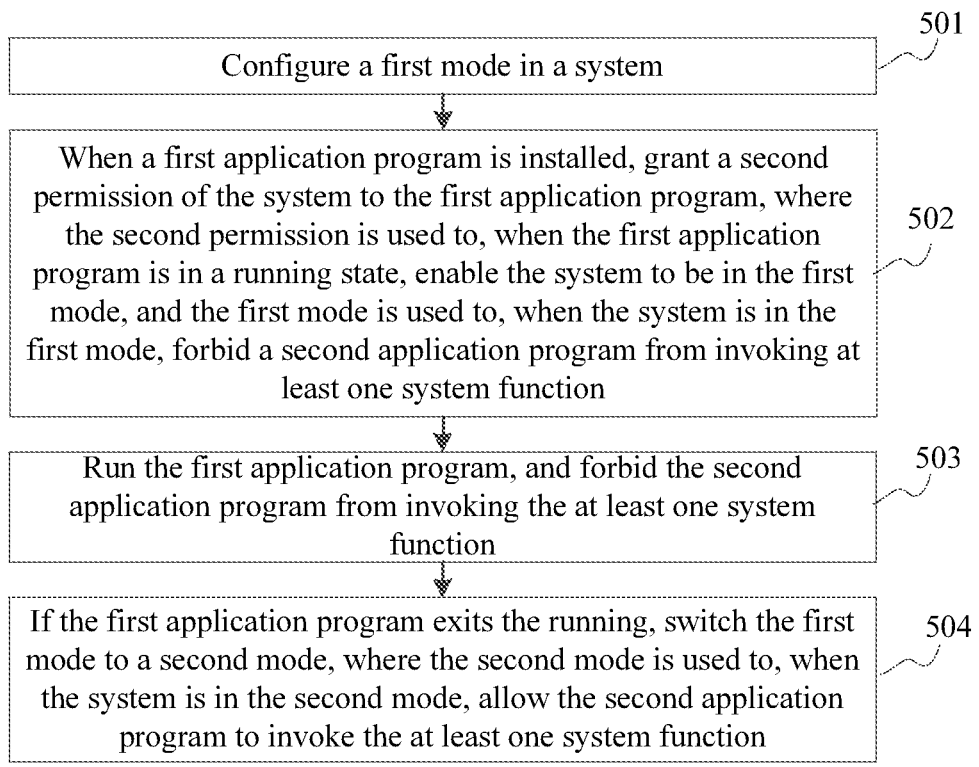
FIG. 5 is a method flowchart of a system function invoking method according to Embodiment 4 of the present disclosure.

Referring to FIG. 5, FIG. 5 shows a method flowchart of a system function invoking method according to Embodiment 4 of the present disclosure. The system function invoking method may be applied to a terminal, and the terminal may be a smart television set, a smartphone, a tablet computer, or the like. The system function invoking method includes the following steps.

Step 501: Configure a first mode in a system.

When the system is in the first mode, the system forbids a second application program from invoking at least one system function of the system. In this embodiment, the system may configure at least one first mode, and may configure at least one system function for each mode. For example, system functions of SMS receiving and calling may be configured in the first mode; or a system function of acquiring a geographic location of a terminal may be configured in the first mode. Therefore, when configuring the first mode, the system needs to configure the at least one system function.

One system function may be implemented by one API, and a permission needs to be checked for invocation of the API. Therefore, disabling information of the permission corresponding to the API may be preset. After reading the disabling information of the permission, the system sets the permission to be such a permission that when the system is in the first mode, the second application program cannot pass system check, such that the second application program is forbidden to invoke the API corresponding to the permission, that is, control of system function invocation is implemented. For example, the disabling information of the permission is disabling information of an SMS receiving permission. Then, when the first application program is in a running state, the second application program cannot pass SMS receiving permission check and the system forbids the second application program from invoking an SMS receiving API, such that the second application program is forbidden to invoke an SMS receiving system function.

Step 502: When a first application program is installed, grant a second permission of the system to the first application program, where the second permission is used to, when the first application program is in a running state, enable the system to be in the first mode, and the first mode is used to, when the system is in the first mode, forbid a second application program from invoking at least one system function.

Because the first application program may enable the system to be in the first mode, and the second application program may be forbidden to invoke the at least one system function in the system when the system is in the first mode, while permission check is needed for invocation of a system function, the second permission of the first application program may be set.

In a first setting manner, configuration information of the second permission is set in a configuration file in an installation package of the first application program, such that when installing the first application program, the system grants the second permission to the first application program according to the configuration information. The first application program may have at least one second permission, and each second permission may correspond to one first mode. Because a same second permission may exist, the first mode may correspond to at least one first application program.

In this embodiment, an Android system is used as an example for description. Then, the configuration file may be an AndroidManifest.xml file, and the configuration information of the second permission in the configuration file may be <need-permission android:name="android.name.PERMISSION_NEED_DISABLE"/>. Further, a process in which the system acquires the configuration information of the second permission is the same as the process in which the system acquires the configuration information of the first permission, and for details, refer to the description of step 203. A process in which the system grants the second permission to the first application program according to the configuration information is the same as the process in which the system grants the first permission to the first application program according to the configuration information, and for details, refer to the description of step 204, which is not described herein again.

In a second setting manner, the system may present at least one first mode that is preset in the system to a user, such that the user selects, from the presented at least one first mode, at least one first mode that the system is in when the first application program is in a running state. A correspondence between the first application program and the at least one first mode may be set and modified by the user, which is not limited in this embodiment. If first application programs that select a same first mode exist, the first mode may correspond to at least one first application program.

In this embodiment, the second application program may be any application program of all application programs except the first application program in the system, such that only the first application program in the system may invoke the at least one system function, thereby improving system security; or the second application program may be any application program of some application programs other than the first application program in the system, such that, besides the first application program, some application programs in the system can also invoke the at least one system function, thereby improving flexibility of system function invocation. The some application programs may be preset and modified, and a setting manner is not limited in this embodiment.

If the second application program is an application program that the user trusts, for each first mode, presentation may be performed for at least one system function configured in the first mode, such that the user selects, from the at least one system function, a system function that allows invocation by the second application program. Further, whether the second application program is an application program that the user trusts may also be set, which is not limited in this embodiment.

Step 503: Run the first application program, and forbid the second application program from invoking the at least one system function.

When the first application program runs in the system, the system may be enabled to be in the at least one first mode according to the setting in step 402, and the second application program is forbidden to invoke the at least one system function.

The forbidding the second application program from invoking the at least one system function may include: for each system function of the at least one system function, if the second application program invoked the system function and the system function is currently in an invoked state of being invoked by the second application program, suspending or ending the invocation of the system function by the second application program; and for each system function of the at least one system function, if the second application program did not invoke the system function or the second application program invoked the system function but the system function is currently not in the invoked state of being invoked by the second application program, forbidding subsequent invocation of the system function by the second application program.

For a process in which the system forbids the second application program from invoking the at least one system function, refer to the description of step 205, which is not described herein again.

Step 504: If the first application program exits running, switch the first mode to a second mode, where the second mode is used to, when the system is in the second mode, allow the second application program to invoke the at least one system function.

In this embodiment, the system may also configure a second mode, where no system function is configured in the second mode. Then, after the first application program exits running, the system may switch the first mode to the second mode and allow the second application program to invoke the at least one system function. The system may determine the running state of the first application program by monitoring a system process, and the running state of the first application program may also be determined in another manner, which is not limited in this embodiment.

It should be additionally noted that, if another first application program in a running state further exists in the system, the system may further be in a first mode corresponding to the other first application program, and only a system function configured in the first mode corresponding to the first application program that exits running is recovered.

Figure 6A:
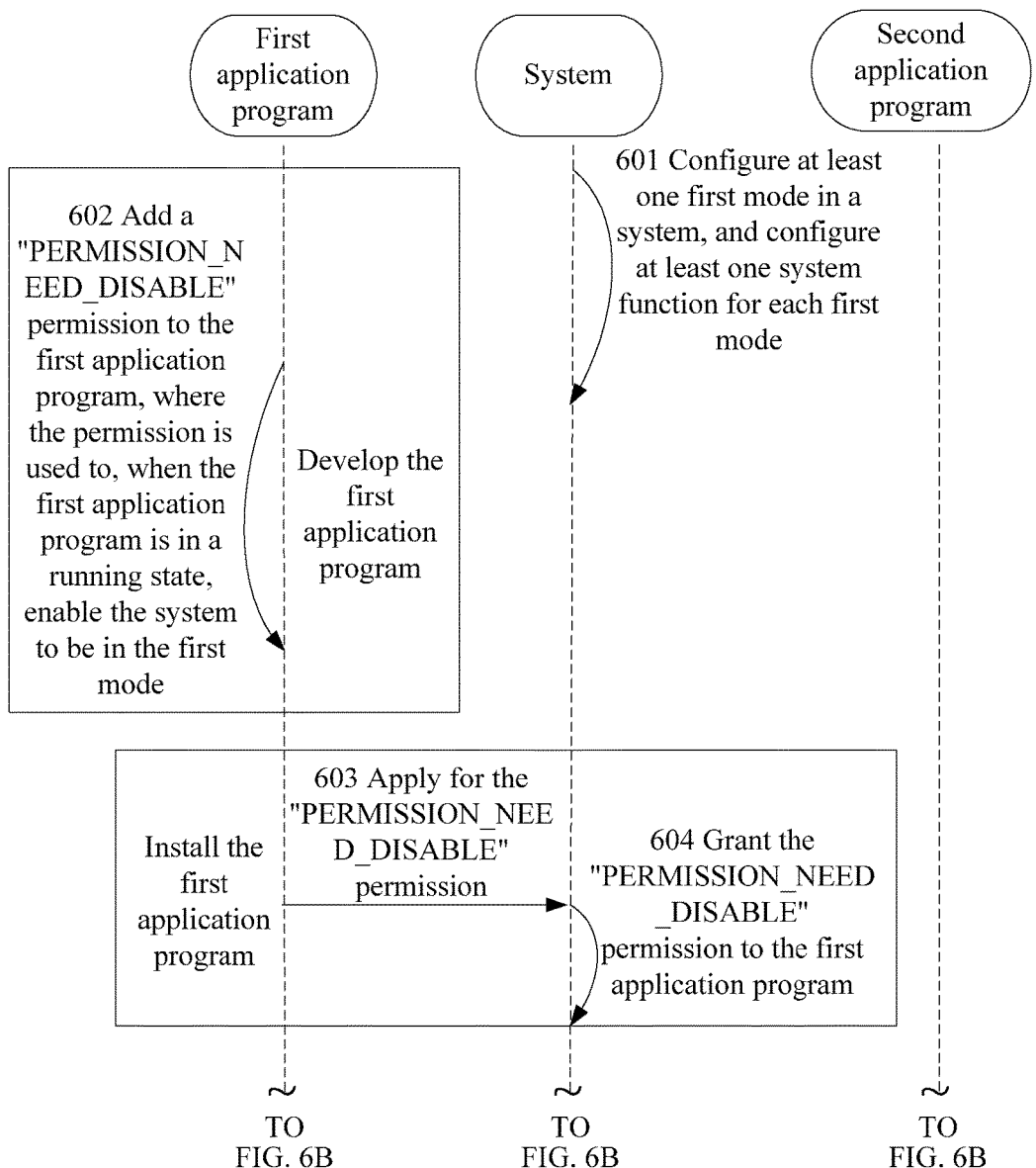
FIG. 6A and FIG. 6B are a first schematic application diagram of the system function invoking method according to Embodiment 4 of the present disclosure.
Figure 6B:
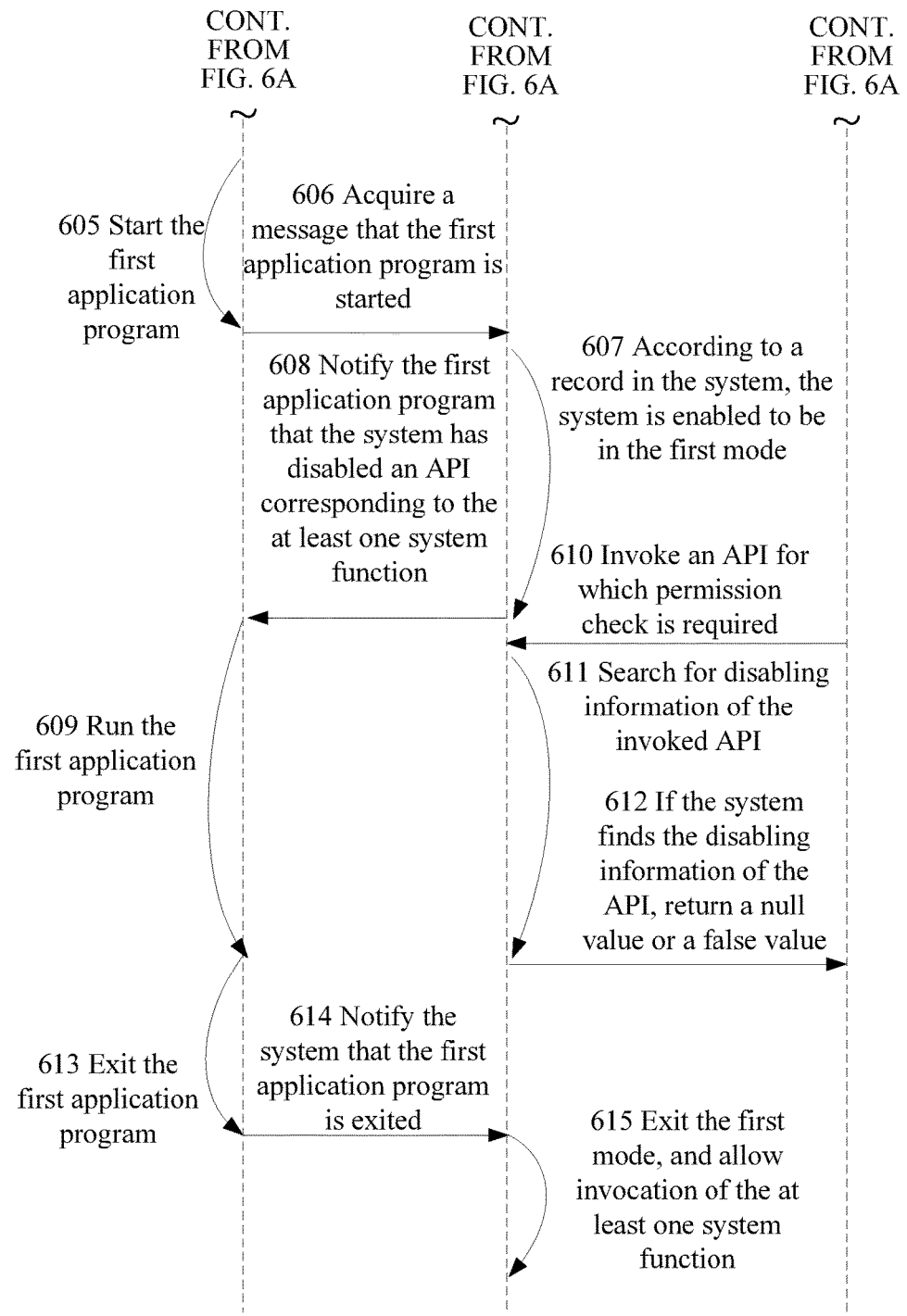

Referring to FIG. 6A and FIG. 6B, this embodiment further provides a first schematic application diagram of the system function invoking method. The system function invoking method is as follows.

Step 601: Configure at least one first mode in a system, and configure at least one system function for each first mode.

Step 602: When a first application program is developed, add a "PERMISSION_NEED_DISABLE" permission to the first application program, where the permission is used to, when the first application program is in a running state, enable the system to be in the first mode.

Step 603: When the first application program is installed, the first application program applies for the "PERMISSION_NEED_DISABLE" permission from the system.

Step 604: The system grants the "PERMISSION_NEED_DISABLE" permission to the first application program.

Step 605: Start the first application program.

Step 606: The system acquires a message that the first application program is started.

Step 607: According to a record in the system, the system is enabled to be in the first mode.

Step 608: The system notifies the first application program that the system has disabled an API corresponding to the at least one system function.

Step 609: Run the first application program.

Step 610: The second application program invokes an API for which permission check is required.

Step 611: The system searches for disabling information of the invoked API.

Step 612: If the system finds the disabling information of the API, return a null value or a false value to the second application program.

Step 613: The first application program exits running.

Step 614: The first application program notifies the system that the first application program exits running.

Step 615: The system exits the first mode, and allows the second application program to invoke the at least one system function.

Figure 7A:
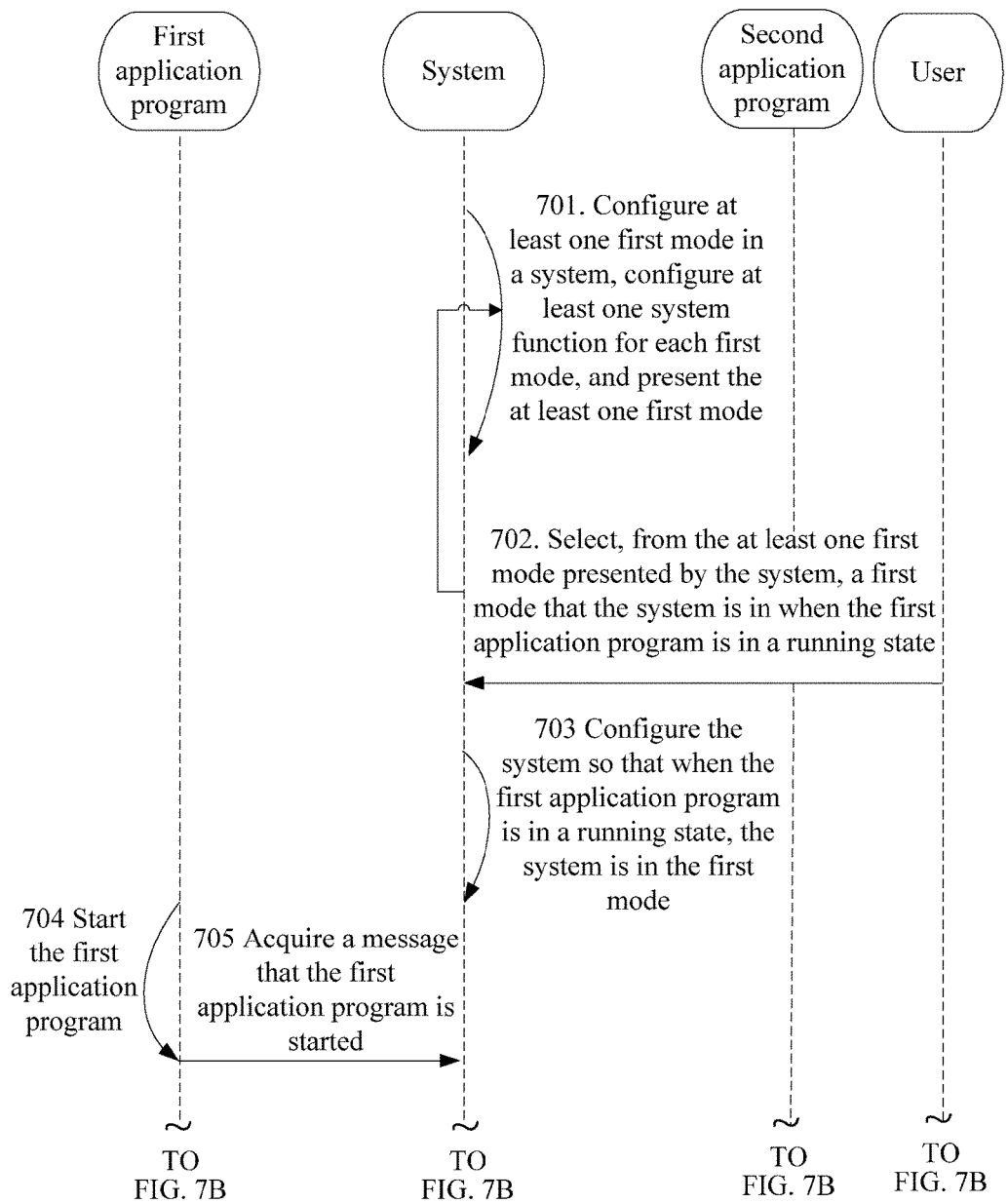
FIG. 7A and FIG. 7B are a second schematic application diagram of the system function invoking method according to Embodiment 4 of the present disclosure.
Figure 7B:
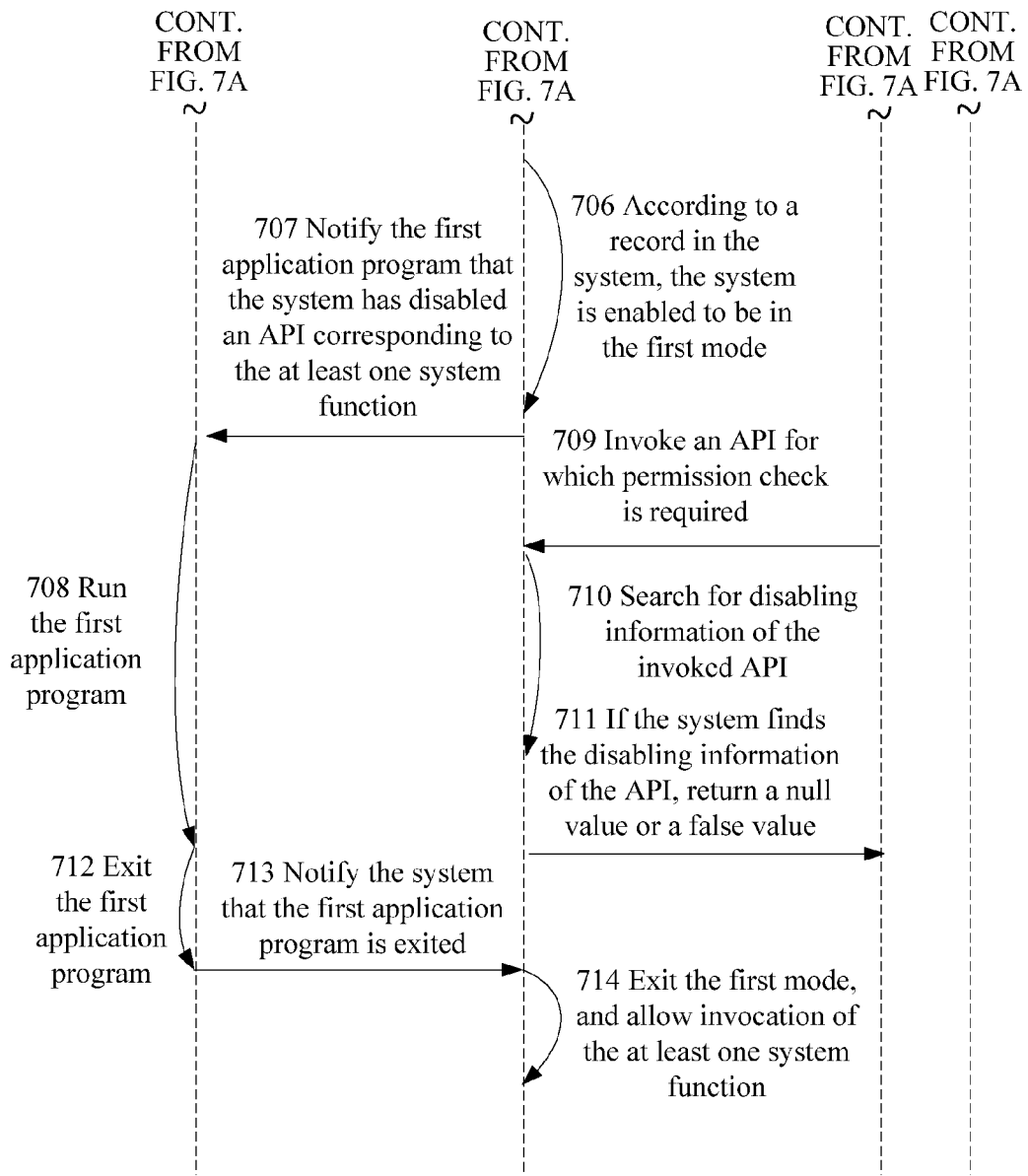

Referring to FIG. 7A and FIG. 7B, this embodiment further provides a second schematic application diagram of the system function invoking method. The system function invoking method is as follows.

Step 701: Configure at least one first mode in a system, configure at least one system function for each first mode, and present the at least one first mode.

Step 702: A user selects, from the at least one first mode presented by the system, a first mode that the system is in when a first application program is in a running state.

Step 703: Configure the system such that when the first application program is in a running state, the system is in the first mode.

Step 704: Start the first application program.

Step 705: The system acquires a message that the first application program is started.

Step 706: According to a record in the system, the system is enabled to be in the first mode.

Step 707: The system notifies the first application program that the system has disabled an API corresponding to the at least one system function.

Step 708: Run the first application program.

Step 709: The second application program invokes an API for which permission check is required.

Step 710: The system searches for disabling information of the invoked API.

Step 711: If the system finds the disabling information of the API, return a null value or a false value to the second application program.

Step 712: The first application program exits running.

Step 713: The first application program notifies the system that the first application program exits running.

Step 714: The system exits the first mode, and allows the second application program to invoke the at least one system function.

In conclusion, according to the system function invoking method provided in this embodiment of the present disclosure, by configuring a first mode in a system; granting, when a first application program is installed, a second permission of the system to the first application program, where the second permission is used to, when the first application program is in a running state, enable the system to be in the first mode, and the first mode is used to, when the system is in the first mode, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved. In addition, the second application program is any application program of some application programs other than the first application program in the system, such that a problem that flexibility of system function invocation is reduced because all application programs except the first application program are forbidden to invoke the at least one system function is resolved and a problem that the flexibility of system function invocation is improved is achieved.

Embodiment 5

Figure 8:
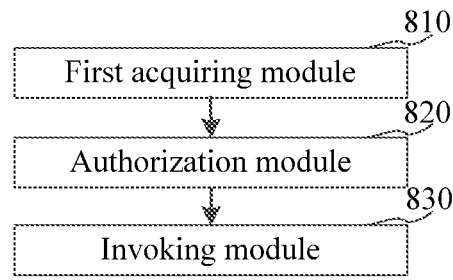
FIG. 8 is a structural block diagram of a system function invoking apparatus according to Embodiment 5 of the present disclosure.

Referring to FIG. 8, FIG. 8 shows a structural block diagram of a system function invoking apparatus according to Embodiment 5 of the present disclosure. The system function invoking apparatus may be applied to a terminal, and the terminal may be a smart television set, a smartphone, a tablet computer, or the like. The system function invoking apparatus includes a first acquiring module 810 adapted to acquire an installation package of a first application program; an authorization module 820 adapted to grant a first permission of a system to the first application program according to the installation package acquired by the first acquiring module 810, where the first permission is used to, when the first application program is in a running state, forbid a second application program from invoking at least one system function; and an invoking module 830 adapted to run the first application program, and forbid, according to the first permission granted by the authorization module 820, the second application program from invoking the at least one system function.

In conclusion, according to the system function invoking apparatus provided in this embodiment of the present disclosure, by granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are that improved and that complexity of system function invocation is reduced are achieved.

Embodiment 6

Figure 9:
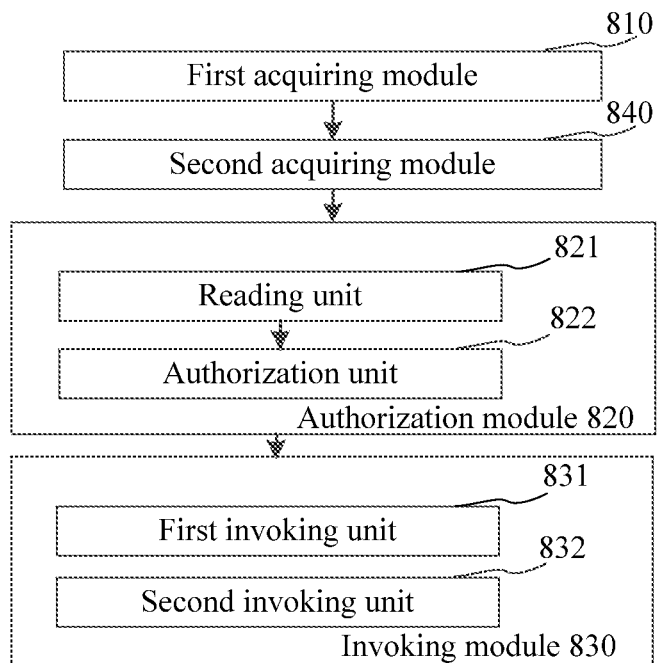
FIG. 9 is a structural block diagram of a system function invoking apparatus according to Embodiment 6 of the present disclosure.

Referring to FIG. 9, FIG. 9 shows a structural block diagram of a system function invoking apparatus according to Embodiment 6 of the present disclosure. The system function invoking apparatus may be applied to a terminal, and the terminal may be a smart television set, a smartphone, a tablet computer, or the like. The system function invoking apparatus includes a first acquiring module 810, an authorization module 820, and an invoking module 830.

The first acquiring module 810 is adapted to acquire an installation package of a first application program.

The authorization module 820 is adapted to grant a first permission of a system to the first application program according to the installation package acquired by the first acquiring module 810, where the first permission is used to, when the first application program is in a running state, forbid a second application program from invoking at least one system function.

The invoking module 830 is adapted to run the first application program, and forbid, according to the first permission granted by the authorization module 820, the second application program from invoking the at least one system function.

The apparatus may further include a second acquiring module 840 adapted to, before the authorization module 820 grants the first permission of the system to the first application program according to the installation package, acquire a configuration file of the first application program from the installation package. The authorization module 820 may include a reading unit 821 adapted to read configuration information of the first permission from the configuration file and an authorization unit 822 adapted to grant the first permission of the system to the first application program according to the configuration information read by the reading unit 821.

Further, the second application program is any application program of all application programs except the first application program in the system; or the second application program is any application program of some application programs other than the first application program in the system.

Further, the invoking module 830 may include a first invoking unit 831 adapted to, for each system function of the at least one system function, if the second application program invoked the system function and the system function is currently in an invoked state of being invoked by the second application program, suspend or end the invocation of the system function by the second application program; and a second invoking unit 832 adapted to, for each system function of the at least one system function, if the second application program did not invoke the system function or the second application program invoked the system function but the system function is currently not in the invoked state of being invoked by the second application program, forbid subsequent invocation of the system function by the second application program.

In conclusion, according to the system function invoking apparatus provided in this embodiment of the present disclosure, by granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved. In addition, the second application program is any application program of some application programs other than the first application program in the system, such that a problem that flexibility of system function invocation is reduced because all application programs except the first application program are forbidden to invoke the at least one system function is resolved and a problem that the flexibility of system function invocation is improved is achieved.

Embodiment 7

Figure 10:
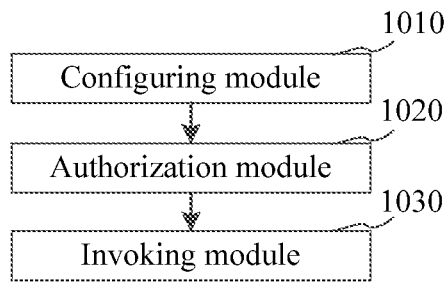
FIG. 10 is a structural block diagram of a system function invoking apparatus according to Embodiment 7 of the present disclosure.

Referring to FIG. 10, FIG. 10 shows a structural block diagram of a system function invoking apparatus according to Embodiment 7 of the present disclosure. The system function invoking apparatus may be applied to a terminal, and the terminal may be a smart television set, a smartphone, a tablet computer, or the like. The system function invoking apparatus includes a configuring module 1010 adapted to configure a first mode in a system; an authorization module 1020 adapted to, when a first application program is installed, grant a second permission of the system to the first application program, where the second permission is used to, when the first application program is in a running state, enable the system to be in the first mode configured by the configuring module 1010, and the first mode is used to, when the system is in the first mode, forbid a second application program from invoking at least one system function; and an invoking module 1030 adapted to run the first application program, and forbid, according to the second permission granted by the authorization module 1020, the second application program from invoking the at least one system function.

In conclusion, according to the system function invoking apparatus provided in this embodiment of the present disclosure, by configuring a first mode in a system; granting, when a first application program is installed, a second permission of the system to the first application program, where the second permission is used to, when the first application program is in a running state, enable the system to be in the first mode, and the first mode is used to, when the system is in the first mode, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved.

Embodiment 8

Figure 11:
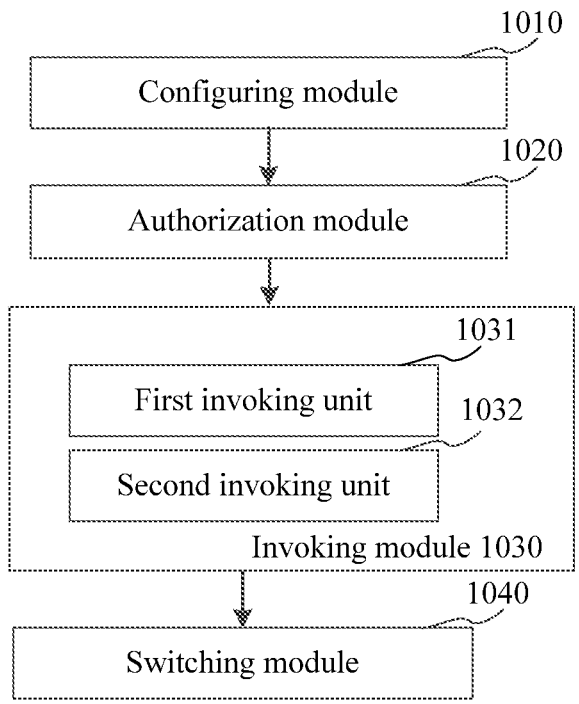
FIG. 11 is a structural block diagram of a system function invoking apparatus according to Embodiment 8 of the present disclosure.

Referring to FIG. 11, FIG. 11 shows a structural block diagram of a system function invoking apparatus according to Embodiment 8 of the present disclosure. The system function invoking apparatus may be applied to a terminal, and the terminal may be a smart television set, a smartphone, a tablet computer, or the like. The system function invoking apparatus includes a configuring module 1010, an authorization module 1020, and an invoking module 1030.

The configuring module 1010 is adapted to configure a first mode in a system.

The authorization module 1020 is adapted to, when a first application program is installed, grant a second permission of the system to the first application program, where the second permission is used to, when the first application program is in a running state, enable the system to be in the first mode configured by the configuring module 1010, and the first mode is used to, when the system is in the first mode, forbid a second application program from invoking at least one system function.

The invoking module 1030 is adapted to run the first application program, and forbid, according to the second permission granted by the authorization module 1020, the second application program from invoking the at least one system function.

Further, the second application program is any application program of all application programs except the first application program in the system; or the second application program is any application program of some application programs other than the first application program in the system.

The apparatus may further include a switching module 1040 adapted to, after the invoking module 1030 forbids the second application program from invoking the at least one system function, if the first application program exits running, switch the first mode to a second mode, where the second mode is used to, when the system is in the second mode, allow the second application program to invoke the at least one system function.

Further, the invoking module 1030 may include a first invoking unit 1031 adapted to, for each system function of the at least one system function, if the second application program invoked the system function and the system function is currently in an invoked state of being invoked by the second application program, suspend or end the invocation of the system function by the second application program; and a second invoking unit 1032 adapted to, for each system function of the at least one system function, if the second application program did not invoke the system function or the second application program invoked the system function but the system function is currently not in the invoked state of being invoked by the second application program, forbid subsequent invocation of the system function by the second application program.

In conclusion, according to the system function invoking apparatus provided in this embodiment of the present disclosure, by configuring a first mode in a system; granting, when a first application program is installed, a second permission of the system to the first application program, where the second permission is used to, when the first application program is in a running state, enable the system to be in the first mode, and the first mode is used to, when the system is in the first mode, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved. In addition, the second application program is any application program of some application programs other than the first application program in the system, such that a problem that flexibility of system function invocation is reduced because all application programs except the first application program are forbidden to invoke the at least one system function is resolved and a problem that the flexibility of system function invocation is improved is achieved.

Embodiment 9

Figure 12:
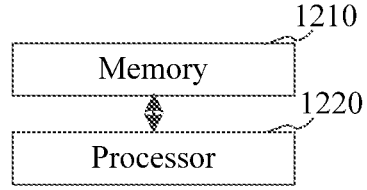
FIG. 12 is a structural block diagram of a system function invoking apparatus according to Embodiment 9 of the present disclosure.

Referring to FIG. 12, FIG. 12 shows a structural block diagram of a system function invoking apparatus according to Embodiment 9 of the present disclosure. The system function invoking apparatus may be applied to a terminal, and the terminal may be a smart television set, a smartphone, a tablet computer, or the like. The system function invoking apparatus includes a processor 1220 and a memory 1210, and the processor 1220 is coupled with the memory 1210.

The memory 1210 stores a computer program, and the processor 1220 may execute the following operations by accessing the computer program.

The processor 1220 is adapted to acquire an installation package of a first application program; grant a first permission of a system to the first application program according to the installation package, where the first permission is used to, when the first application program is in a running state, forbid a second application program from invoking at least one system function; and run the first application program and forbid the second application program from invoking the at least one system function.

In conclusion, according to the system function invoking apparatus provided in this embodiment of the present disclosure, by granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved.

Embodiment 10

An embodiment of the present disclosure provides a system function invoking apparatus. The system function invoking apparatus may be applied to a terminal, and the terminal may be a smart television set, a smartphone, a tablet computer, or the like. The system function invoking apparatus includes a processor 1220 and a memory 1210, and the processor 1220 is coupled with the memory 1210.

The memory 1210 stores a computer program, and the processor 1220 may execute the following operations by accessing the computer program.

The processor 1220 is adapted to acquire an installation package of a first application program; grant a first permission of a system to the first application program according to the installation package, where the first permission is used to, when the first application program is in a running state, forbid a second application program from invoking at least one system function; and run the first application program and forbid the second application program from invoking the at least one system function.

Further, the processor 1220 is further adapted to, before the first permission of the system is granted to the first application program according to the installation package, acquire a configuration file of the first application program from the installation package.

The processor 1220 is further adapted to read configuration information of the first permission from the configuration file and grant the first permission of the system to the first application program according to the configuration information.

Further, the second application program is any application program of all application programs except the first application program in the system; or the second application program is any application program of some application programs other than the first application program in the system.

Further, the processor 1220 is adapted to, for each system function of the at least one system function, if the second application program invoked the system function and the system function is currently in an invoked state of being invoked by the second application program, suspend or end the invocation of the system function by the second application program; and for each system function of the at least one system function, if the second application program did not invoke the system function or the second application program invoked the system function but the system function is currently not in the invoked state of being invoked by the second application program, forbid subsequent invocation of the system function by the second application program.

In conclusion, according to the system function invoking apparatus provided in this embodiment of the present disclosure, by granting a first permission of a system to a first application program according to an installation package, where the first permission is used to, when the first application program is in a running state, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved. In addition, the second application program is any application program of some application programs other than the first application program in the system, such that a problem that flexibility of system function invocation is reduced because all application programs except the first application program are forbidden to invoke the at least one system function is resolved and a problem that the flexibility of system function invocation is improved is achieved.

Embodiment 11

Figure 13:
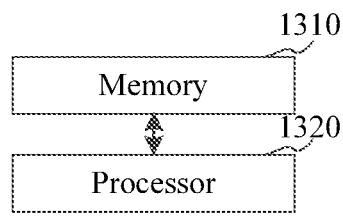
FIG. 13 is a structural block diagram of a system function invoking apparatus according to Embodiment 11 of the present disclosure.

Referring to FIG. 13, FIG. 13 shows a structural block diagram of a system function invoking apparatus according to Embodiment 11 of the present disclosure. The system function invoking apparatus may be applied to a terminal, and the terminal may be a smart television set, a smartphone, a tablet computer, or the like. The system function invoking apparatus includes a processor 1320 and a memory 1310, and the processor 1320 is coupled with the memory 1310.

The memory 1310 stores a computer program, and the processor 1320 may execute the following operations by accessing the computer program.

The processor 1320 is adapted to configure a first mode in a system; when a first application program is installed, grant a second permission of the system to the first application program, where the second permission is used to, when the first application program is in a running state, enable the system to be in the first mode, and the first mode is used to, when the system is in the first mode, forbid a second application program from invoking at least one system function; and run the first application program and forbid the second application program from invoking the at least one system function.

In conclusion, according to the system function invoking apparatus provided in this embodiment of the present disclosure, by configuring a first mode in a system; granting, when a first application program is installed, a second permission of the system to the first application program, where the second permission is used to, when the first application program is in a running state, enable the system to be in the first mode, and the first mode is used to, when the system is in the first mode, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved.

Embodiment 12

An embodiment of the present disclosure provides a system function invoking apparatus. The system function invoking apparatus may be applied to a terminal, and the terminal may be a smart television set, a smartphone, a tablet computer, or the like. The system function invoking apparatus includes a processor 1320 and a memory 1310, and the processor 1320 is coupled with the memory 1310.

The memory 1310 stores a computer program, and the processor 1320 may execute the following operations by accessing the computer program.

The processor 1320 is adapted to configure a first mode in a system; when a first application program is installed, grant a second permission of the system to the first application program, where the second permission is used to, when the first application program is in a running state, enable the system to be in the first mode, and the first mode is used to, when the system is in the first mode, forbid a second application program from invoking at least one system function; and run the first application program and forbid the second application program from invoking the at least one system function.

Further, the second application program is any application program of all application programs except the first application program in the system; or the second application program is any application program of some application programs other than the first application program in the system.

Further, the processor 1320 is further adapted to, after the second application program is forbidden to invoke the at least one system function, if the first application program exits running, switch the first mode to a second mode, where the second mode is used to, when the system is in the second mode, allow the second application program to invoke the at least one system function.

Further, the processor 1320 is adapted to, for each system function of the at least one system function, if the second application program invoked the system function and the system function is currently in an invoked state of being invoked by the second application program, suspend or end the invocation of the system function by the second application program; and for each system function of the at least one system function, if the second application program did not invoke the system function or the second application program invoked the system function but the system function is currently not in the invoked state of being invoked by the second application program, forbid subsequent invocation of the system function by the second application program.

In conclusion, according to the system function invoking apparatus provided in this embodiment of the present disclosure, by configuring a first mode in a system; granting, when a first application program is installed, a second permission of the system to the first application program, where the second permission is used to, when the first application program is in a running state, enable the system to be in the first mode, and the first mode is used to, when the system is in the first mode, forbid a second application program from invoking at least one system function; and running the first application program and forbidding the second application program from invoking the at least one system function, problems that acquiring of a highest permission brings an insecure factor, that a user needs to frequently perform disabling setting, that operation complexity of system function invocation is increased, and that efficiency of system function invocation is reduced are resolved, and effects that security and efficiency of system function invocation are improved and that complexity of system function invocation is reduced are achieved. In addition, the second application program is any application program of some application programs other than the first application program in the system, such that a problem that flexibility of system function invocation is reduced because all application programs except the first application program are forbidden to invoke the at least one system function is resolved and a problem that the flexibility of system function invocation is improved is achieved.

It should be noted that, when the system function invoking apparatus provided in the foregoing embodiments performs system function invocation, division of the foregoing functional modules is merely used as an example for description. In actual application, the foregoing functions may be allocated to different functional modules for implementation as required, that is, an internal structure of the system function invoking apparatus is divided into different functional modules to complement all or some of the functions described above. In addition, the system function invoking apparatus and the system function invoking method that are provided in the foregoing embodiments are based on a same concept. For an implementation process of the system function invoking apparatus and the system function invoking method, refer to the method embodiments, which are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The foregoing storage medium may be a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A system function invoking method implemented by a terminal device, the method comprising:
   acquiring an installation package of a first application program;
   acquiring configuration information of a first permission from the installation package, wherein the first permission is not a highest level permission and forbids a second application program from invoking a system function in response to the first application program running;
   granting the first permission to the first application program according to the configuration information;
   recording the configuration information of the first permission in an installation the of the terminal device; and
   forbidding, according to the configuration information, the second application program from invoking the system function in response to the first application program running and independent of user notification.

2. The system function invoking method of claim 1, further comprising acquiring a configuration file comprising disabling information of an application programming interface (API) corresponding to the first permission, wherein forbidding the second application program from invoking the system function comprises forbidding, according to the configuration information, the second application program from invoking the API in response to the first application program running.

3. The system function invoking method of claim 1, wherein the second application program is any application program of all application programs in the terminal device except the first application program.

4. The system function invoking method of claim 1, wherein the second application program is any application program of some application programs in the terminal device other than the first application program.

5. The system function invoking method of claim 1, wherein forbidding the second application program from invoking the system function comprises suspending or ending invocation of the system function in response to the second application program invoking the system function prior to the first application program running.

6. A terminal device comprising: a storage device; and
   a processor coupled to the storage device and configured to:
   acquire an installation package of a first application program;
   acquire configuration information of a first permission from the installation package, wherein the first permission is not a highest level permission and forbids a second application program from invoking a system function in response to the first application program running;
   grant the first permission of a system to the first application program according to the configuration information;
   record the configuration information of the first permission in an installation the of the terminal device; and
   forbid, according to the configuration information, the second application program from invoking the system function in response to the first application program running.

7. The terminal device of claim 6, wherein the processor is further configured to:
   acquire a configuration file comprising disabling information of an application programming interface (API) corresponding to the first permission; and forbid, according to the configuration information, the second application program from invoking the API in response to the first application program running.

8. The terminal device of claim 6, wherein the second application program is any application program of all application programs in the terminal device except the first application program.

9. The terminal device of claim 6, wherein the second application program is any application program of some application programs in the terminal device other than the first application program.

10. The terminal device of claim 6, wherein the processor is further configured to suspend or end invocation of the system function in response to the second application program invoking the system function prior to the first application program running.

11. A system function invoking method comprising:
configuring a first mode in a system;
acquiring an installation package of a first application program;
acquiring configuration information of a first permission from the installation package, wherein the first permission is not the highest level permission and forbids a second application program from invoking a system function in response to the first application program running;
granting the first permission of a system to the first application program according to the configuration information;
recording the configuration information of the first permission in an installation file of the terminal device;
running the first application program;
configuring the system such that the system is in the first mode in response to the first application program running; and
forbidding, according to the first permission, a second application program from invoking the system function in response to the first application program running.

12. The system function invoking method of claim 11, wherein the second application program is any application program of all application programs in the system except the first application program.

13. The system function invoking method of claim 11, wherein the second application program is any application program of some application programs in the system other than the first application program.

14. The system function invoking method of claim 11, further comprising switching, after forbidding the second application program from invoking the system function, from the first mode to a second mode in response to the first application program exiting running, wherein the second mode allows the second application program to invoke the system function in response to the system being in the second mode.

15. The system function invoking method of claim 11, wherein forbidding the second application program from invoking the system function comprises suspending or ending invocation of the system function in response to the second application program invoking the system function prior to the first application program running.

16. The system function invoking method of claim 11, further comprising notifying the first application program that the system has disabled an application programming interface (API) corresponding to the system function.

17. The system function invoking method of claim 16, wherein forbidding the second application program from invoking the system function comprises:
invoking the API;
searching for disabling information of the API; and
returning a null value or a false value to the second application program in response to finding the disabling information.

* * * * *

UNITED STATES PATENT AND TRADEMARK OFFICE
CERTIFICATE OF CORRECTION

PATENT NO. : 10,452,867 B2  
APPLICATION NO. : 14/936826  
DATED : October 22, 2019  
INVENTOR(S) : Huang et al.

Page 1 of 1

It is certified that error appears in the above-identified patent and that said Letters Patent is hereby corrected as shown below:

On the Title Page

Second Page, First Column, item (56) Last Foreign Patent Documents: "CR 100468343 C 3/2009" should read "CN 100468343 C 3/2009"

In the Claims

Claim 1, Column 24 Line 14: "installation the of the" should read "installation file of the"

Signed and Sealed this  
Thirty-first Day of December, 2019

Andrei Iancu  
*Director of the United States Patent and Trademark Office*